Figure 1:
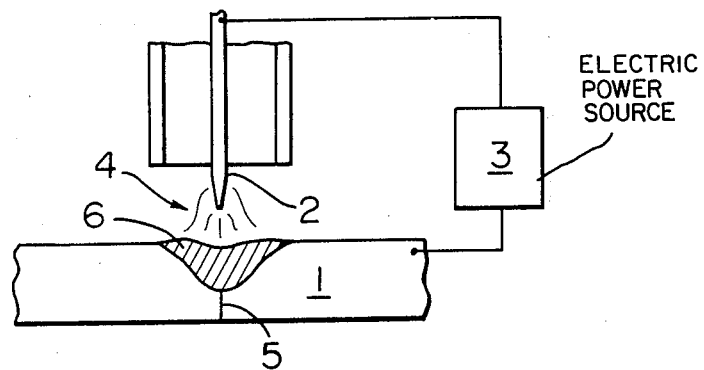

United States Patent [19]

Okada et al.

[11] 3,988,567
[45] Oct. 26, 1976

[54] METHOD OF DETECTING THE STATE OF FUSION OF THE WORKPIECE IN WELDING

[75] Inventors: Akira Okada; Michio Inagaki, both of Tokyo, Japan

[73] Assignee: National Research Institute for Metals, Tokyo, Japan

[22] Filed: Mar. 25, 1975

[21] Appl. No.: 561,974

[30] Foreign Application Priority Data
Mar. 30, 1974 Japan............................. 49-35175

[52] U.S. Cl. ................... 219/137 R; 219/121 EM
[51] Int. Cl.[2] ........................................ B23K 9/10
[58] Field of Search .......... 219/137 R, 137 PS, 135, 219/131 R, 131 WR, 121 EB, 121 EM

[56] References Cited
UNITED STATES PATENTS

| | | | |
|---|---|---|---|
| 3,299,250 | 1/1967 | Vilkas et al. ..................... | 219/131 R |
| 3,335,254 | 8/1967 | Vilkas et al. ................. | 219/131 R X |
| 3,496,327 | 2/1970 | Vilkas ......................... | 219/131 R X |
| 3,702,915 | 11/1972 | Vilkas et al. ................. | 219/137 RS |

FOREIGN PATENTS OR APPLICATIONS
331,857   4/1972   U.S.S.R........................... 219/131 R

Primary Examiner—J. V. Truhe
Assistant Examiner—Clifford C. Shaw
Attorney, Agent, or Firm—Sherman & Shalloway

[57] ABSTRACT

In welding a workpiece from its one side by arc or electron beam welding, a method of detecting the state of fusion of the workpiece which comprises superposing on the arc or electron beam current a signal current selected from the group consisting of positive and negative pulse currents and sinusoidal current to change the heat input applied to the workpiece at the side where the arc or electron beam has been applied, and measuring the waveforms and/or phase differences of the change of said heat input and the corresponding change of temperature at the opposite side of the workpiece, whereby the state of fusion of the workpiece is detected.

11 Claims, 16 Drawing Figures

(a)

(a) (b) (c)

(a)

(b)

(c)

(d)

(b)

(a)

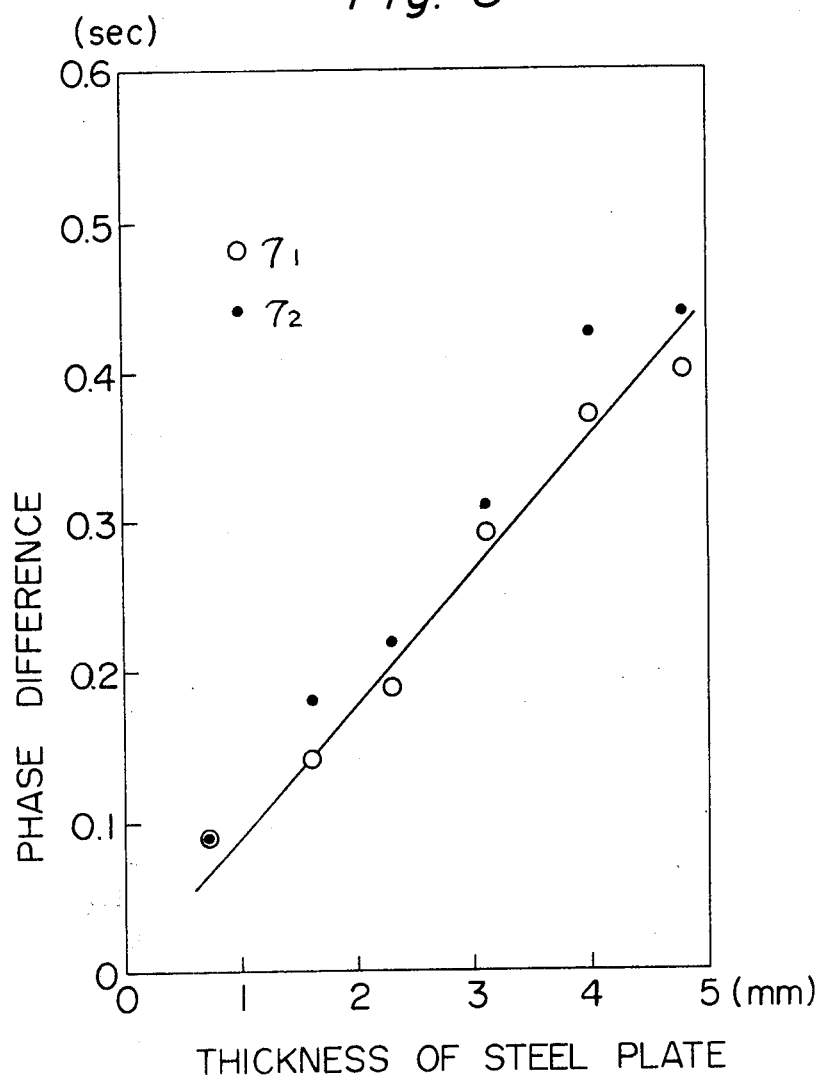

METHOD OF DETECTING THE STATE OF FUSION OF THE WORKPIECE IN WELDING

This invention relates to a method of detecting the state of fusion of the material when welding it by the arc-welding or electron beam-welding process.

In carrying out the arc welding or electron beam welding of a workpiece, that portion in the vicinity of the surface, i.e., the portion near the arc or electron beam, directly fuses by the heat generated by the arc or electron beam. However, the fusion of the interior and rear side of the workpiece remote from the arc or electron beam takes place by transfer of heat such as heat conduction and transmission of heat by the convection currents of the fused metal. The detection of the state of fusion of the interior and rear side of the workpiece being welded is extremely important for judging the quality of the welding results as well as for furthering the automatic control of welding. Expecially in the case where welding is performed from one side of the workpiece, the state of fusion greatly affects the quality of the resulting weld.

In the conventional methods for detecting the state of fusion of the workpiece being welded, either the temperature itself of the rear side of the workpiece being welded or the backing is measured with a temperature measuring device such as a thermoelectric element or a photoelectric element, and the so obtained measurements are used in estimating the penetration depth of the fusion or in determining as to whether or not the fusion has reached the rear side. However, since in all of these methods the measurement is made of the temperature of a specific spot on the rear side of the workpiece being welded or the temperature of a specific spot in the backing, the temperature measuring device must be disposed directly below the welding line at the rear side of the workpiece being welded and, moreover, the temperature measuring device must be made to follow (track) the welding accurately as it proceeds. Hence, in the conventional methods there was not only the necessity for a complicated device for accomplishing this tracking by the temperature measuring device but also a space for accomodating the device. For example, such a device could not be used in the case where small-size pipes were to be welded and, for this reason, its use is restricted.

It is therefore an object of the present invention to provide a method by which the state of fusion can be detected at a location remote from the part of the workpiece being welded.

Another object of the invention is to provide a method of detecting the state of fusion, which does not require that the temperature measuring device be moved as the welding proceeds.

The foregoing objects of the invention are achieved by a method of detecting the state of fusion of a workpiece wherein in welding a workpiece from its one side by means of an arc or electron beam a signal current consisting of a positive and negative pulse current or a sinusoidal current is superposed on the arc or electron beam current to change the heat input from the arc or electron beam applied side, whereby the state of fusion of the workpiece can be detected by measurement of the waveforms and/or phase differences of the change of said heat input and the temperature change at the opposite side of the workpiece.

Figure 7:
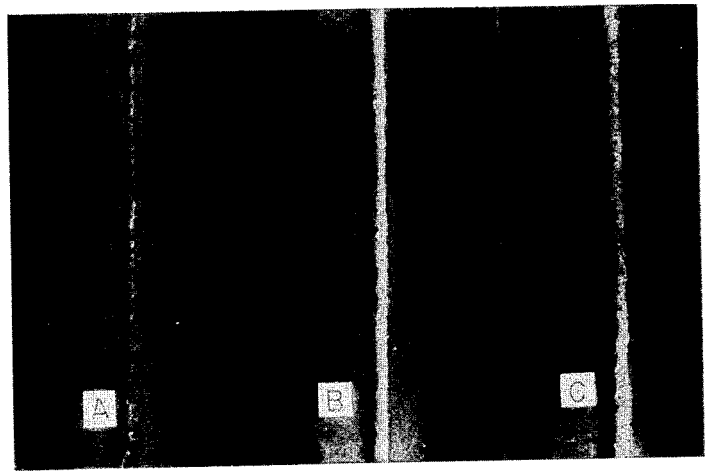

The theory of the present invention as well as examples of the method and apparatus to be used will be described hereinafter by reference to the accompanying drawings, wherein:

FIG. 1 is a sectional view illustrating the usual state of fusion of a workpiece when performing arc welding;

FIGS. 2(a), (b) and (c) are sectional views illustrating the various aspects of the state of fusion of a workpiece;

FIGS. 3(a), (b), (c) and (d) are waveform diagrams for illustrating the welding current, the signal current and their synthesis;

FIGS. 4(a) and (b) and 5 are schematic views illustrating respectively instances of the disposition of the device for detecting the state of fusion by the invention method in welding a workpiece of sheet form and that of cylindrical form;

FIGS. 6(p), (a), (b) and (c) are diagrams of waveforms illustrating an instance of the phase difference and waveform of a changed welding current and temperature change at the rear side of a workpiece;

FIGS. 7 are photographs of the appearances of the rear sides of workpieces corresponding to the states of fusion presented in the hereinafter given Table 1; and FIG. 8 is a graph showing the phase differences at the several thicknesses of steel plates immediately preceding the fusion of their rear sides.

Referring to FIG. 1, when the workpiece 1 of sheet form and the welding electrode 2 are connected with an electric power source for welding 3, and an arc 4 is formed, a part of the root 5 of the workpiece 1 being welded becomes fused by the arc heat and forms fused metal 6. While the fused metal 6 forms directly and instantaneously by the arc 4 at the vicinity of the surface portion of the workpiece 1 being welded, the fusion of those portions remote from the arc takes place by the transmission of the arc heat via the fused metal 6. The transmission of heat in the fused metal takes place not only by the heat conduction of the fused metal but also by the convection currents resulting from the difference in surface tension ascribable to differences in temperature of the fused metal and the magnetic force of the welding current. When the workpiece being welded is structural steel, the speed of heat transmission of this convective heat transfer due to the fused metal currents is much faster than that ascribable to the heat conduction through the solid metal. The theory of this method resides in detecting the state of fusion of the workpiece being welded on the basis of the difference in the transmission of heat through the solid metal by heat conduction and by the convection currents of the fused metal. That is to say, the heat of the arc is imparted to the front side surface of the workpiece being welded, and this heat is transmitted to the rear side through the fused and unfused metal portions, raising the temperature of the rear side. Now, if a part of the heat input imparted by the arc is suddenly changed for just a short period of time, some time is required before the effect of this change reaches the rear side and changes the temperature thereof, this being dependent on the speed of the transmission of heat from the front side to the rear side of the workpiece being welded. The present invention is directed to a method which comprises determining the time lag in the temperature change between the front and rear sides of the workpiece and detecting the state of fusion of the workpiece from the magnitude of this time lag. The determination of the time lag is performed in the following manner. While it is the practice in arc welding to perform the welding by applying a given amount of heat to the workpiece being welded using an arc, in the case of the present invention there is applied, in addition to this given amount of heat for performing the welding, a signal heat input for a short period of time, whereby the temperature of the surface of the fused metal at the front side is changed for just a short period of time. The simplest way of changing the heat input is by varying the welding current. This may be carried out by superposing the given welding current necessary for carrying out the welding with a signal current for imparting the signal heat input. The change in temperature of the front side of the fused metal reaches the rear side of the metal by heat transmission, with the consequence that the temperature of the rear side changes. This change in temperature of the rear side can be detected, say, by measuring the radiant energy that is emitted in accordance with the temperature change of the rear side, using a photoelectric element disposed at the rear side of the workpiece being welded. The time lag between the temperature change of the front side surface of the workpiece being welded and that of the rear side thereof based on the superposition of the signal current can be obtained by measuring the phase differences of the change in the signal current and the change in the photoelectric current resulting from the conversion of radiant energy by means of a photoelectric element.

Figure 2:
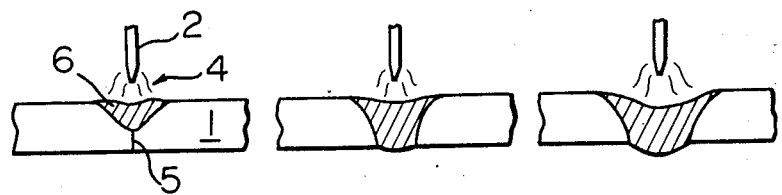
Figure 3:
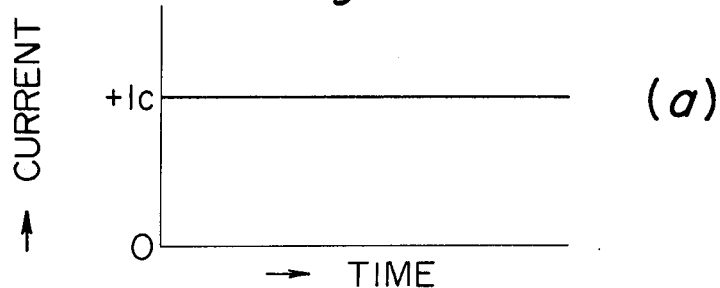
Figure 3:
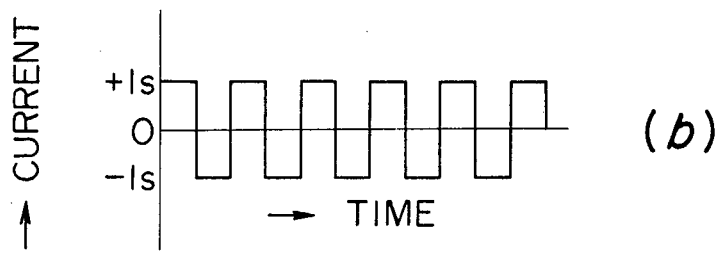
Figure 3:
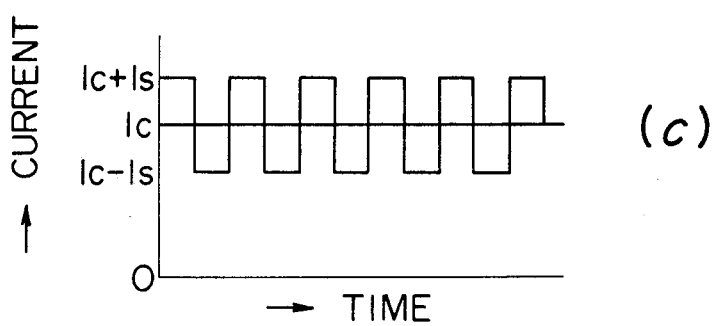
Figure 3:
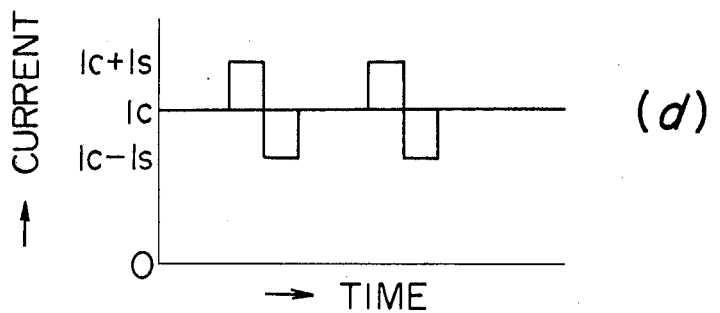

The state of fusion of the part being welded can be determined as described hereinafter on the basis of the phase differences that have been measured in the foregoing manner. In FIG. 2 are shown sectional views illustrating various aspects of the state of fusion of the workpiece being welded in the case of that shown in FIG. 1. Of the figures, FIG. 2($a$) is the case where the fusion has not reached the rear side. While the transmission of heat of the fused metal portion is by means of the relatively fast convection currents, the transmission of heat of the unfused portion is carried out by heat conduction. Hence, the speed of heat transmission becomes relatively slow. On the other hand, FIGS. 2($b$) and ($c$) are instances where fusion has taken place to the rear side of the workpiece being welded. In these cases, the speed of the transmission of heat to the rear side is by means of the convection currents of the fused metal. Hence, the speed becomes relatively fast. That is, when a signal heat input is applied in the case where the state of fusion of the workpiece is that shown in FIG. 2($a$), the phase difference between the change in temperature at the front side surface of the metal and that at the rear side would be great, while in the case of FIGS. 2($b$) and ($c$) the phase differences would be small. It is necessary to measure continuously the phase differences to detect the state of fusion during the welding This is most suitably accomplished by superposing continuously, as the signal current for obtaining the signal heat input, either a pulse current having a given period or a sinusoidal current. FIG. 3($a$) shows a given welding current Ic required for obtaining the necessary heat input for carrying out the welding, FIG. 3($b$) shows an instant of a continuous signal current $\pm$Is of the positive and negative pulse waveform having a given period, and FIG. 3($c$) shows a synthesized current (Ic$\pm$Is) obtained by synthesizing the currents of FIGS. 3($a$) and ($b$).

When welding is carried out using a synthesized current such as described, the rear side of the workpiece being welded fuses properly as shown in FIG. 2($b$), if the value of the given welding current Ic is proper. Now, if a signal current of positive pulse current +Is is applied when the workpiece being welded is in this state, the synthesized current increases by Is over Ic. Hence, the rear side of the workpiece being welded fuses further to enhance the action of the convection currents of the fused metal, with the consequence that the temperature phase difference between the front and rear sides due to the signal heat input will become an extremely small value. On the other hand, when a negative pulse current −Is is applied, the synthesized current decreases by a value of Is from Ic. Hence, not only the fusion of the rear side of the material being welded decreases but a part of that portion which has been in a fused state immediately prior to the application of the negative signal pulse current solidifies as well, with the consequence that the action of the convection currents of the fused metal in the vicinity of the rear side becomes weakened. Hence, the phase difference due to the signal heat input will become greater than that of the case where a positive pulse current has been applied.

Next, when the given current Ic is greater than the proper value, the rear side of the workpiece being welded, as shown in FIG. 2($c$), fuses completely. Hence, even though a negative signal pulse −Is current is applied, the rear side remains fused, and the action of the convection currents is active. Accordingly, when both positive and negative signal pulse currents are applied in the case shown in FIG. 2($c$), in both cases the phase differences become extremely small.

On the other hand, when the given current Ic is smaller than its proper value, fusion does not take place to the rear side as shown in FIG. 2($a$), and hence even though both positive and negative signal pulse currents are applied, in both instances the phase differences will become relatively great. Thus, as described hereinabove, the states of fusion shown in FIGS. 2($a$), ($b$) and ($c$) can be definitely determined by the application of positive and negative signal pulse currents to the welding current.

In those cases where continuous detection is not necessary, say, in such cases where the welding conditions such as the welding position and the groove accuracy of the workpiece are maintained constant during the welding operation, and there is no great change in the conditions of the welding, the continuous superposition of a signal current is not necessary and, as shown in FIG. 3($d$), the superposition of the signal current may be performed intermittently.

As the signal current to be superposed, there can be used in addition to the pulse current a sinusoidal current. There is no special restriction on the waveform of the pulse current.

Further, while the above description pertained to arc welding, the state of fusion of the portion being welded when using an electron beam can also be detected in accordance with the same principle and by the same procedure.

As is apparent from the theory and method of the present invention described above, the value of the temperature itself at the rear side of the workpiece being welded is not measured, but rather the temperature change resulting from the signal heat input. Hence, it suffices to detect a part of the radiant energy that is emitted from the rear side of the workpiece being welded using, for example, a detecting device such as a photoelectric element. Therefore, the position in which the detecting device is to be placed can be determined relatively freely. Further, the device need not follow the progress of the welding and hence does not require moving. Thus even though the material being welded is a pipe of small diameter or of complicated structure, the state of its fusion can be readily detected by the invention method.

Figure 4:
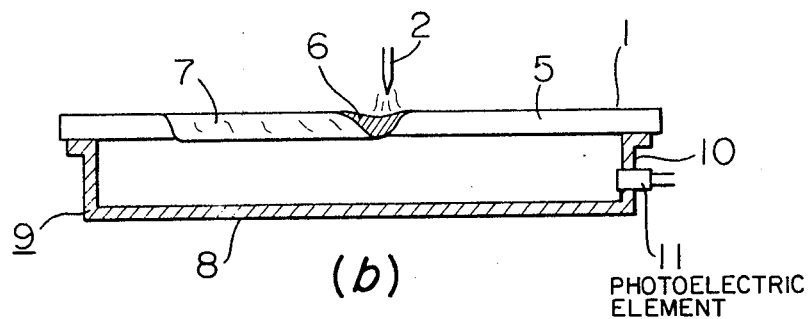
Figure 4:
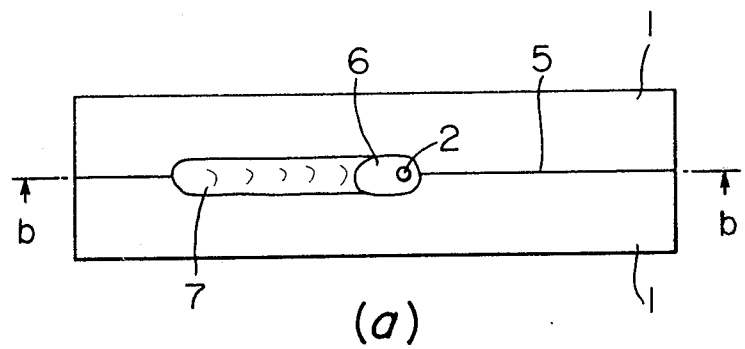
Figure 5:
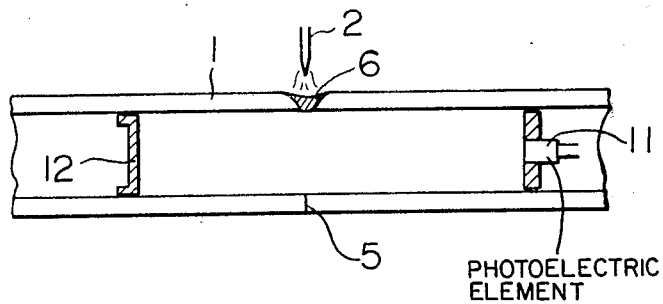

For instance, as shown in FIGS. 4 and 5, the detecting device can be disposed at the side of the workpiece being welded far remote from the rear side of the part being welded.

Referring to FIGS. 4(a) and (b), the former is a plane view illustrating a workpiece of sheet form being welded as seen from a position above the material being welded, and the latter is a sectional view cut along the line b—b of the former. Two plates (both numbered 1) are being welded along the route 5 with the welding progressing from the left to the right side of the drawing. The reference numeral 2 refers to the welding electrode, while 7 is the weld metal at the portion where the welding has been completed, and 6 is the weld metal in a state of fusion. Referring to FIG. 4(b), the workpiece 1, 1 is being welded while being mounted on a box-shaped supporting bench 9 having a bottom 8 and in such a fashion that the rear side of the workpiece 1,1 is shielded from the surrounding light. At a side wall 10 of the box-shaped supporting bench 9 there is disposed a photoelectric element 11 in such a manner that it penetrates into the interior of the box-shaped supporting bench. This photoelectric element 11 detects a part of the radiant energy that is emitted from the rear side of the portion being welded 6. FIG. 5 illustrates the instance of a tubular-shaped material in whose interior the photoelectric element is disposed, while the other end is covered by means of a light-shielding plate 12.

Thus, as hereinbefore-described, the method of this invention can be practiced with a relatively simple device and, moreover, it becomes possible definitely to detect the state of fusion of the workpiece being welded. Further, in the case where pipes are to be welded, the invention method can be readily applied by disposing the photoelectric element inside the pipes. Again, the invention method can be applied even in the case of pipes of small diameter, since few restrictions are imposed as to the position of the photoelectric element.

Next, an instance of the detection by the invention method of the state of fusion in the TIG arc welding of structural steel plates will be described. A welding experiment was carried out by using cold rolled steel plates of 4-mm thickness and welding the same for a distance of 20 cm at a welding speed of 4.5 cm per minute, the state of fusion being detected with the device shown in FIG. 4. The results of the measurement are shown in Table 1, below.

Table 1

| Experi-ment | Synthesized Current (amp) | | Phase Difference (sec) | | State of Fusion | Remarks |
| --- | --- | --- | --- | --- | --- | --- |
| | Peak | Bottom | $\tau1$ | $\tau2$ | | |
| A-1 | 100 | 18 | 0.41 | 0.44 | insufficient fusion | |
| A-2 | 155 | 20 | 0.36 | 0.39 | do | corresponds to Fig. 2(a), FIG. 6(a) |
| B | 200 | 20 | 0 | 0.25 | proper rear side fusion | corresponds to Fig. 2(b), FIG. 6(b) |
| C | 233 | 20 | 0 | 0 | do | corresponds to FIG. 2(c), FIG. 4(c) |

Figure 6:
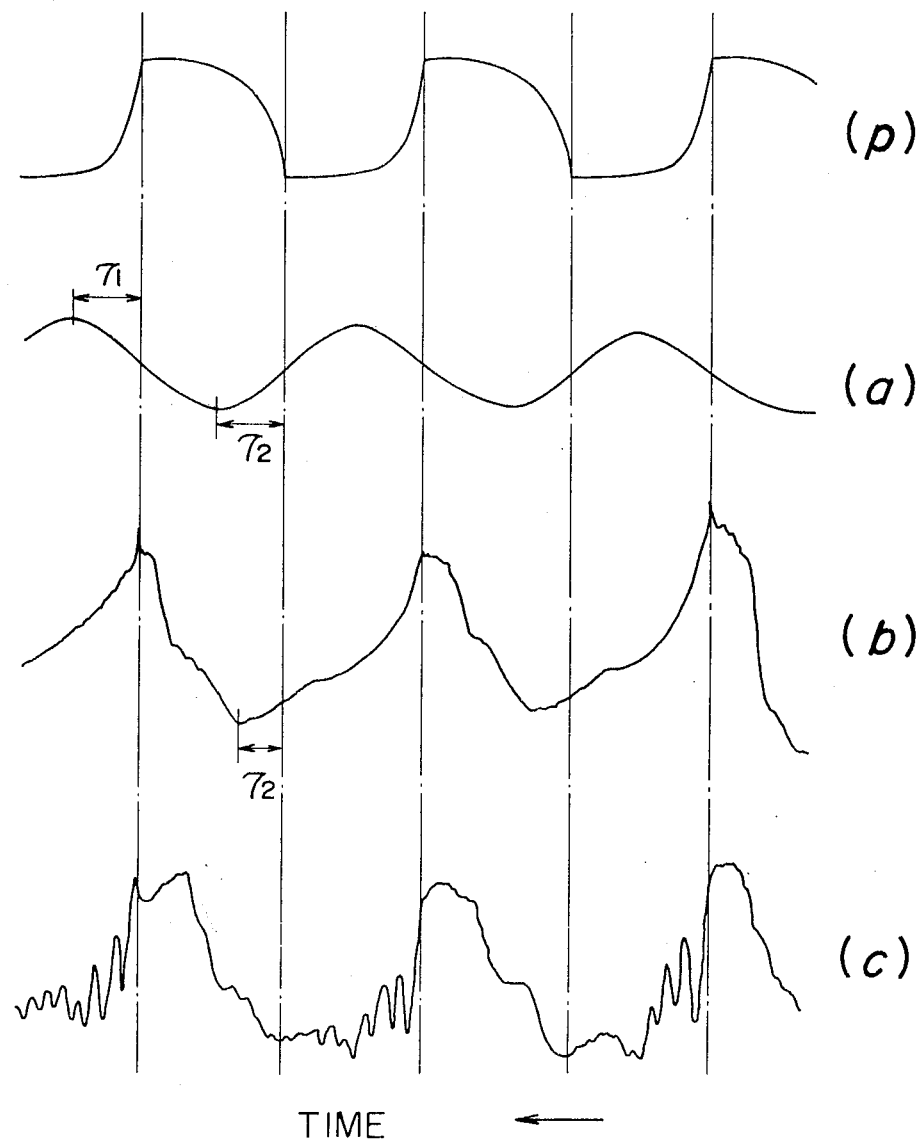

The waveforms of the synthesized currents used in these welding operations as well as the waveform diagrams of the temperature changes detected at the rear sides of the workpieces are shown in FIG. 6.

The (p) of FIG. 6 is the waveform of the synthesized current in this case, its pulse width being 0.5 second.

In Table 1 the Experiment A-1 and A-2 are the instances where the fusion was insufficient and correspond to the state of fusion shown in FIG. 2(a). Experiment A-1 is that where the penetration depth is shallow, while Experiment A-2 is that where the penetration depth is deep, and the metal has been practically fused up to the vicinity of the rear side, there being a slight difference in the values of the phase differences of these two cases. In FIG. 6(a) there is shown the waveform of the case where the temperature change of the rear side was measured with a photoelectric element in Experiment A-2. This waveform approximates the sinusoidal wave. Further, if in FIG. 6(p) the phase difference when the pulse signal current is at its peak is represented by $\tau_1$, while the phase difference when the pulse signal current is at its bottom is represented by $\tau_2$, it can then be seen that in both cases of $\tau_1$ and $\tau_2$ the values are relatively large. Experiment B of Table 1 is that where the fusion of the rear side was proper and corresponds to that shown in FIG. 2(b). In this case the phase difference $\tau_1$ is a value close to zero, while the average value of $\tau_2$ is of the order of 0.25, there thus being a clear difference between $\tau_1$ and $\tau_2$. The waveform of the temperature change of the rear side in this case is shown in FIG. 6(b). As the phase difference $\tau_1$ is nearly zero and there is a phase difference $\tau_2$ of the order of 0.25 second, the waveform approximates that of a serrate waveform. The rear side in the case of Experiment C is that where the fusion has proceeded too far and corresponds to that shown in FIG. 2(c). The phase difference $\tau_1$ and $\tau_2$ in this case are values nearly zero. Again, the waveform of the temperature change of the rear side in this case is shown in FIG. 6(c), and since the transmission of heat has been active, the waveform becomes close to that of the signal current waveform. In addition, there appears a waveform of damped oscillation of the order of about 16 Hz at a time position corresponding to the course where the signal current shifts from its peak to the bottom. This shows that there was generated an up-and-down oscillation in the fused metal layer by the sudden decrease in the arc force in concomitance with the sudden decrease in the current. In this case the rear side was fully fused. It can thus be seen from the foregoing results, that the state of fusion can be definitely determined from the phase difference between the signal current and the photoelectric current converted by means of the photoelectric element from the temperature change of the rear side. In addition, it is seen that it is also possible to judge the state of fusion from the waveform of the photoelectric current converted by the photoelectric element from the temperature change of the rear side.

FIGS. 7-A, B and C are photographs showing the fused portion of the rear sides of the steel plates obtained by the foregoing Experiments A-2, B and C. FIG. 7-A is that of Experiment A-2, FIG. 7-B is that of Experiment B, and FIG. 7-C is that of Experiment C.

Welding experiments were carried out by the same procedures as hereinbefore described but using cold rolled steel plates of varying thicknesses ranging from 0.75 to 4.8 mm and employing a welding speed of 10 cm per minute. The phase differences at a state immediately before fusion reached the rear side were measured with the results shown in Table 2, below.

Table 2

| Plate Thickness (mm) | Synthesized Current (amp) | | Phase Difference (sec) | |
|---|---|---|---|---|
| | Peal | Bottom | $\tau_1$ | $\tau_2$ |
| 0.75 | 15 | 10 | 0.09 | 0.09 |
| 1.6 | 73 | 28 | 0.14 | 0.18 |
| 2.3 | 98 | 35 | 0.19 | 0.22 |
| 3.2 | 145 | 48 | 0.29 | 0.31 |
| 4.0 | 260 | 20 | 0.37 | 0.41 |
| 4.8 | 280 | 65 | 0.40 | 0.44 |

FIG. 8 is a graph showing the phase differences $\tau_1$ and $\tau_2$ of the foregoing Table 2 plotted against the plate thickness. When the phase difference measured is above the plotted points at the several plate thicknesses in FIG. 8, the fusion in all such cases is judged to be insufficient.

Further, it was found from the results of the experiments that in the case of steel plates of a thickness from 2 to 5 mm there existed on the whole the relationships shown in the following Table 3 between the plate thickness $t$ (cm) and the phase differences by which the propriety of the state of fusion is to be judged. That is to say, it is possible by measuring the phase differences to judge as to whether or not the state of fusion is optimal on the basis of said table.

Table 3

| State of Fusion | Phase Difference | | Pattern of Temperature Change of Rear Side |
|---|---|---|---|
| | $\tau 1$ (sec) | $\tau 2$ (sec) | |
| Insufficient fusion | $\geq 0.8t$ | $\geq 0.8t$ | approaches sine wave |
| Proper fusion | $<0.8t$ | $0.1 \leq \tau_2 < 0.8t$ | serrate waveform |
| Excessive fusion | $<0.8t$ | $<0.1$ | approaches signal waveform; waveform of fused metal oscillation appears at position of abrupt decline in signal current. |

What is claimed is:

1. In welding a workpiece from one side using arc or electron beam welding, a method of detecting the state of fusion of the workpiece which comprises:
   A. superposing on an arc or electron beam welding current a signal current selected from the group consisting of a positive and negative pulse current and a sinusoidal current, to vary the heat input applied to the workpiece at the point where the welding current is applied;
   B. measuring the energy change at the side of the workpiece opposite the point where the welding and signal currents are applied, said change resulting from the heat input of the signal current; and
   C. determining the state of fusion of the weld by comparing both the phase difference between the signal current input and the measured energy change, and the waveform of the signal current input with the waveform of the measured energy change.

2. In welding a workpiece from one side using arc or electron beam welding, a method detecting the state of fusion of the workpiece which comprises:
   A. superposing on an arc or electron beam welding current a signal current selected from the group consisting of a positive and negative pulse current and a sinusoidal current, to vary the heat input applied to the workpiece at the point where the welding current is applied;
   B. measuring the energy change at the side of the workpiece opposite the point where the welding and signal currents are applied, said change resulting from the heat input of the signal current; and
   C. determining the state of fusion of the weld by comparing the phase difference between the signal current input and the measured energy change.

3. A method of claim 2 wherein said signal current is superposed intermittently.

4. The method of claim 2 wherein said signal current is superposed at given periods.

5. The method of claim 2 wherein said signal current is superposed continuously.

6. The method of claim 2 in which the energy change is measured by a photoelectric element.

7. In welding a workpiece from one side using arc or electron beam welding, a method of detecting the state of fusion of the workpiece which comprises:
   A. superposing on an arc or electron beam welding current a signal current selected from the group consisting of a positive and negative pulse current and a sinusoidal current, to vary the heat input applied to the workpiece at the point where the welding current is applied;
   B. measuring the energy change at the side of the workpiece opposite the point where the welding and signal currents are applied, said change resulting from the heat input of the signal current; and
   C. determining the state of fusion of the weld by comparing the waveform of the signal current with the waveform of the measured energy change.

8. A method of claim 7 wherein said signal current is superposed intermittently.

9. The method of claim 7 wherein said signal current is superposed at given periods.

10. The method of claim 7 wherein said signal current is superposed continuously.

11. The method of claim 7 in which the energy change is measured by a photoelectric element.

* * * * *